(12) United States Patent
Nabe

(10) Patent No.: US 12,479,217 B2
(45) Date of Patent: Nov. 25, 2025

(54) INKJET RECORDING APPARATUS AND INKJET RECORDING METHOD

(71) Applicant: KYOCERA Document Solutions Inc., Osaka (JP)

(72) Inventor: Akifumi Nabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 186 days.

(21) Appl. No.: 18/515,247

(22) Filed: Nov. 20, 2023

(65) Prior Publication Data

US 2024/0165972 A1 May 23, 2024

(30) Foreign Application Priority Data

Nov. 22, 2022 (JP) ................... 2022-186673

(51) Int. Cl.
| | |
|---|---|
| B41J 11/00 | (2006.01) |
| B41J 2/155 | (2006.01) |
| B41J 2/21 | (2006.01) |
| C09D 11/033 | (2014.01) |
| C09D 11/037 | (2014.01) |
| C09D 11/14 | (2006.01) |
| C09D 11/322 | (2014.01) |
| C09D 11/40 | (2014.01) |

(52) U.S. Cl.
CPC ......... *B41J 11/00244* (2021.01); *B41J 2/155* (2013.01); *B41J 2/2107* (2013.01); *B41J 11/007* (2013.01); *C09D 11/033* (2013.01); *C09D 11/037* (2013.01); *C09D 11/14* (2013.01); *C09D 11/322* (2013.01); *C09D 11/40* (2013.01)

(58) Field of Classification Search
CPC .... B41J 11/00244; B41J 2/155; B41J 2/2107; B41J 11/007; B41J 2202/21; B41J 11/00216; B41J 11/0024; C09D 11/033; C09D 11/037; C09D 11/14; C09D 11/322; C09D 11/40
See application file for complete search history.

(56) References Cited

U.S. PATENT DOCUMENTS

| | | | |
|---|---|---|---|
| 9,522,548 B2 * | 12/2016 | Nishimura | ........... B41J 11/0015 |
| 10,471,739 B2 | 11/2019 | Matsumoto et al. | |
| 10,576,757 B2 * | 3/2020 | Nakamura | ............. B41J 2/2117 |
| 2019/0030918 A1 | 1/2019 | Matsumoto et al. | |

FOREIGN PATENT DOCUMENTS

WO      2017138436 A1     8/2017

* cited by examiner

*Primary Examiner* — Justin Seo
(74) *Attorney, Agent, or Firm* — Studebaker Brackett PLLC

(57) ABSTRACT

An inkjet recording apparatus includes an ink set, a conveyance section that conveys a recording medium, an image forming section disposed opposite to one side of the conveyance section for performing inkjet recording on the recording medium with the ink set, and a heating section disposed opposite to the image forming section with the conveyance section therebetween for heating the recording medium. The ink set includes an ink of a first color, an ink of a second color, an ink of a third color, and an ink of a fourth color. The ink of the first color, the ink of the second color, the ink of the third color, and the ink of the fourth color each contain a pigment, a polysaccharide, an aqueous medium, and binder resin particles. The aqueous medium includes a glycol ether. The glycol ether has a boiling point of no greater than 200° C.

8 Claims, 1 Drawing Sheet

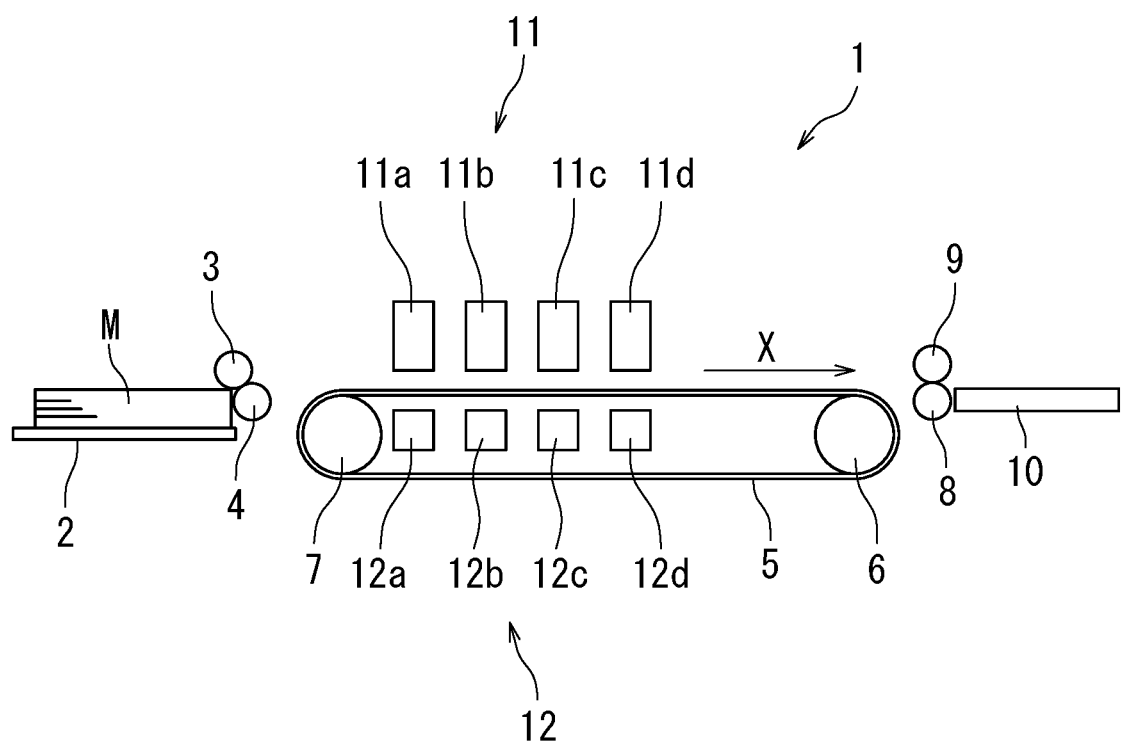

INKJET RECORDING APPARATUS AND INKJET RECORDING METHOD

INCORPORATION BY REFERENCE

The present application claims priority under 35 U.S.C. § 119 to Japanese Patent Application No. 2022-186673, filed on Nov. 22, 2022. The contents of this application are incorporated herein by reference in their entirety.

BACKGROUND

The present disclosure relates to an inkjet recording apparatus and an inkjet recording method.

Recent rapid progress in inkjet recording apparatuses achieves formation of high-definition images comparable to silver-halide photographs when using photographic paper. There are demands that the inkjet recording apparatuses can exhibit excellent ink ejection stability and enable inhibition of occurrence of blurring (particularly, blurring caused when inks of different colors are ejected toward adjacent two areas of a recording medium) in color image formation using the inks. Inhibition of occurrence of blurring is significant when using non-permeable recording mediums such as resin films (e.g., OHP sheets, OPP films, and PET films). Also, the inkjet recording apparatuses are demanded to inhibit production of white lines.

There is proposed, for example, a method in which ink viscosity is increased as a method for inhibiting occurrence of blurring in the inkjet recording apparatuses. By increasing viscosity of an ink, the ink hardly wet and spread over recording mediums, thereby inhibiting occurrence of blurring. As another method for inhibiting occurrence of blurring in the inkjet recording apparatuses, an inkjet recording apparatus is proposed, for example, that includes an under heater that heats recording mediums from the back side of the recording mediums. The inkjet recording apparatus including the under heater inhibits occurrence of blurring by accelerating ink drying on recording mediums through heating of the recording mediums.

SUMMARY

An inkjet recording apparatus according to an aspect of the present disclosure includes an ink set, a conveyance section that conveys a recording medium, an image forming section that is disposed at a location opposite to one side of the conveyance section and that performs inkjet recording on the recording medium with the ink set, and a heating section that is disposed at a location opposite to the image forming section with the conveyance section therebetween and that heats the recording medium. The ink set includes an ink of a first color, an ink of a second color, an ink of a third color, and an ink of a fourth color. The image forming section includes a first line recording head that ejects the ink of the first color, a second line recording head that ejects the ink of the second color, a third line recording head that ejects the ink of the third color, and a fourth line recording head that ejects the ink of the fourth color. The heating section includes a first heater disposed at a location opposite to the first line recording head with the conveyance section therebetween, a second heater disposed at a location opposite to the second line recording head with the conveyance section therebetween, a third heater disposed at a location opposite to the third line recording head with the conveyance section therebetween, and a fourth line recording head disposed at a location opposite to the fourth line recording head with the conveyance section therebetween. The ink of the first color, the ink of the second color, the ink of the third color, and the ink of the fourth color each contain a pigment, a polysaccharide, an aqueous medium, and binder resin particles. The aqueous medium includes a glycol ether. The glycol ether has a boiling point of no greater than 200° C. A percentage content of the polysaccharide in each of the ink of the first color, the ink of the second color, the ink of the third color, and the ink of the fourth color is at least 0.01% by mass and no greater than 0.20% by mass. A percentage content of the glycol ether in the ink of the first color is at least 11.50% by mass and no greater than 15.50% by mass. A percentage content of the glycol ether in the ink of the second color is at least 14.50% by mass and no greater than 18.50% by mass. A percentage content of the glycol ether in the ink of the third color is at least 17.50% by mass and no greater than 21.50% by mass. A percentage content of the glycol ether in the ink of the fourth color is at least 20.50% by mass and no greater than 24.50% by mass. A heating temperature of the first heater is at least 60° C. and no greater than 65° C. A heating temperature of the second heater is at least 50° C. and no greater than 55° C. A heating temperature of the third heater is at least 40° C. and no greater than 45° C. A heating temperature of the fourth heater is at least 30° C. and no greater than 35° C.

An inkjet recording method according to another aspect of the present disclosure includes forming, using the aforementioned inkjet recording apparatus, an image on the recording medium.

BRIEF DESCRIPTION OF THE DRAWINGS

FIGURE is a diagram illustrating main components of an inkjet recording apparatus.

DETAILED DESCRIPTION

The following describes embodiments of the present disclosure. Note that in the following, measurement values for volume median diameter ($D_{50}$) are values as measured using a dynamic light scattering type particle size distribution analyzer (e.g., "ZETASIZER (registered Japanese trademark) NANO ZS", product of Malvern Instruments Ltd.) unless otherwise stated. The term "(meth)acryl" is used as a generic term for both acryl and methacryl in the present specification. One type of each component described in the present specification may be used independently, or two or more types of the component may be used in combination.

<Inkjet Recording Apparatus>

An inkjet recording apparatus according to an embodiment of the present disclosure includes an ink set, a conveyance section that conveys a recording medium, an image forming section that is disposed at a location opposite to one side of the conveyance section and that performs inkjet recording on the recording medium with the ink set, and a heating section that is disposed at a location opposite to the image forming section with the conveyance section therebetween and that heats the recording medium. The ink set includes an ink of a first color, an ink of a second color, an ink of a third color, and an ink of a fourth color. The image forming section includes a first line recording head that ejects the ink of the first color, a second line recording head that ejects the ink of the second color, a third line recording head that ejects the ink of the third color, and a fourth line recording head that ejects the ink of the fourth color. The heating section includes a first heater disposed at a location opposite to the first line recording head with the conveyance section therebetween, a second heater disposed at a location opposite to the second line recording head with the conveyance section therebetween, a third heater disposed at a location opposite to the third line recording head with the conveyance section therebetween, and a fourth heater disposed at a location opposite to the fourth line recording head with the conveyance section therebetween. The ink of the first color, the ink of the second color, the ink of the third color, and the ink of the fourth color each contain a pigment, a polysaccharide, an aqueous medium, and binder resin particles. The aqueous medium includes a glycol ether. The glycol ether has a boiling point of no greater than 200° C. The percentage content of the polysaccharide in each of the ink of the first color, the ink of the second color, the ink of the third color, and the ink of the fourth color is at least 0.01% by mass and no greater than 0.20% by mass. The percentage content of the glycol ether in the ink of the first color is at least 11.50% by mass and no greater than 15.50% by mass. The percentage content of the glycol ether in the ink of the second color is at least 14.50% by mass and no greater than 18.50% by mass. The percentage content of the glycol ether in the ink of the third color is at least 17.50% by mass and no greater than 21.50% by mass. The percentage content of the glycol ether in the ink of the fourth color is at least 20.50% by mass and no greater than 24.50% by mass. A heating temperature of the first heater is at least 60° C. and no greater than 65° C. A heating temperature of the second heater is at least 50° C. and no greater than 55° C. A heating temperature of the third heater is at least 40° C. and no greater than 45° C. A heating temperature of the fourth heater is at least 30° C. and no greater than 35° C.

Examples of the recording medium used in the inkjet recording apparatus of the present disclosure include recording mediums made from paper, resin, metal, glass, and ceramics. The inkjet recording apparatus of the present disclosure is preferably used for image formation on non-permeable recording mediums such as resin films. The inkjet recording apparatus of the present disclosure has an advantage of inhibiting occurrence of blurring even in image formation on non-permeable recording mediums on which blurring tends to occur.

The inkjet recording apparatus of the present disclosure includes an image forming section including four line recording heads. The line recording heads are arranged at substantially regular intervals in parallel to a conveyance direction of the recording medium. The four line recording heads include a first line recording head, a second line recording head, a third line recording head, and a fourth line recording head arranged in the stated order from upstream in terms of the conveyance direction of the recording medium. The inkjet recording apparatus of the present disclosure ejects (performs inkjet ejection with) a cyan ink, a magenta ink, a yellow ink, and a black ink necessary for general color printing using the four line recording heads.

The inkjet recording apparatus of the present disclosure includes an ink set. The ink set includes an ink of a first color, an ink of a second color, an ink of a third color, and an ink of a fourth color. In the following, the ink of the first color, the ink of the second color, the ink of the third color, and the ink of the fourth color may each be also referred to below simply as an "ink".

The inkjet recording apparatus of the present disclosure includes four heaters. The four heaters include a first heater, a second heater, a third heater, and a fourth heater arranged in the stated order from upstream in terms of the conveyance direction of the recording medium. The first heater dries the ink of the first color ejected on the recording medium from the first line recording head. The second heater dries the ink of the second color ejected on the recording medium from the second line recording head. The third heater dries the ink of the third color ejected on the recording medium from the third line recording head. The fourth heater dries the ink of the fourth color ejected on the recording medium from the fourth line recording head.

As a result of having the above features, the inkjet recording apparatus of the present disclosure can exhibit excellent ink ejection stability and inhibit occurrence of blurring and production of white lines. The reasons thereof are inferred as follows. The inks in the inkjet recording apparatus of the present disclosure each contain a polysaccharide as a thickener. The inkjet recording apparatus of the present disclosure can inhibit occurrence of blurring by providing given viscosity to the inks through the percentage content of the polysaccharide in each of the inks being set to at least 0.01% by mass. By contrast, as a result of the percentage content of the polysaccharide in each of the inks being set to no greater than 0.20% by mass so that the inks do not have excessively high viscosity, the inkjet recording apparatus of the present disclosure can form images having dots whose diameter is ensured, thereby inhibiting production of white lines. Furthermore, the inks each contain a glycol ether with a boiling point of no greater than 200° C. The glycol ether with such a low boiling point, which dries quickly, can impart quick drying properties to the inks. Furthermore, the inkjet recording apparatus of the present disclosure includes a heating section that accelerates drying of inks landed on the recording mediums. As such, the inkjet recording apparatus of the present disclosure, in which the inks each contain a low-boiling point glycol ether and in which the heating section is provide, can effectively inhibit occurrence of blurring.

Here, in a known inkjet recording apparatus using four inks, the later an ink that is ejected in the sequence, the more likely it is to cause blurring. This is because when an ink ejected in the later sequence lands on a recording medium, there are already one or more other inks (ink(s) ejected in the earlier sequence) around it. In view of the foregoing, the percentage content of the glycol ether in the ink to be ejected in the later sequence is set higher among the four inks to enhance quick drying properties. As such, the inkjet recording apparatus of the present disclosure can effectively inhibit occurrence of blurring of an ink ejected in the later sequence by enhancing quick drying properties of the ink to be ejected in the later sequence.

However, when known inks with quick drying properties and a known heating section are adopted to a known inkjet recording apparatus, the inks may dry on the nozzle surfaces of line recording heads to cause degradation of ejection stability. In view of the foregoing, the heating temperatures of the four heaters are set differently so that the heating temperature is set lower for the heater located more downstream in terms of the conveyance direction of the recording medium in the inkjet recording apparatus of the present disclosure. That is, the heating temperature of a heater (e.g., the first heater or the second heater) for drying an ink (e.g., the ink of the first color or the ink of the second color) with relatively poor quick drying properties is relatively high in the inkjet recording apparatus of the present disclosure. Thus, ink drying can be ensured by setting a relatively high heating temperature for an ink with relatively poor quick drying properties in the inkjet recording apparatus of the present disclosure. Furthermore, the heating temperature of a heater (e.g., the third heater or the fourth heater) for drying an ink (e.g., the ink of the third color or the ink of the fourth color) with relatively excellent quick drying properties is relatively low in the inkjet recording apparatus of the present disclosure. Thus, ink drying on the nozzle surfaces of the line recording heads can be inhibited by setting a relatively low heating temperature for an ink with relatively excellent quick drying properties in the inkjet recording apparatus of the present disclosure. As a result, the inkjet recording apparatus of the present disclosure can exhibit excellent ejection stability.

The inkjet recording apparatus of the present disclosure is described below with reference to the drawing. Note that the drawing schematically illustrates elements of configuration in order to facilitate understanding. Properties such as the size and number of each element of configuration illustrated in the drawing may differ from actual properties in order to facilitate preparation of the drawings.

FIGURE is a diagram illustrating main components of an inkjet recording apparatus 1. As illustrated in FIG. 1, the inkjet recording apparatus 1 mainly includes a conveyor belt 5 (conveyance section) that conveys a sheet M of a recording medium, an image forming section 11 that is disposed above the conveyor belt 5 and that performs inkjet recording on the sheet M with an ink set, and a heating section 12 that is disposed just below the image forming section 11 with the conveyor belt 5 therebetween and that heats the sheet M. The inkjet recording apparatus 1 further includes a sheet feed tray 2, a sheet feed roller 3, a sheet feed driven roller 4, a belt drive roller 6, a belt driven roller 7, an ejection roller 8, an ejection driven roller 9, and an exit tray 10. The sheet feed tray 2 is disposed at the left end in FIG. 1 of the inkjet recording apparatus 1. The sheet feed tray 2 accommodates sheets M of a recording medium. The sheet feed roller 3 and the sheet feed driven roller 4 are disposed at one end of the sheet feed tray 2. The sheet feed roller 3 picks up the accommodated sheets M one by one from the uppermost sheet M, and conveys and feeds the sheet M to the conveyor belt 5. The sheet feed driven roller 4 is pressed against the sheet feed roller 3 to be rotationally driven. In the following, the sheet conveyance direction of the recording medium M may be also referred to as a "sheet conveyance reaction X".

The conveyor belt 5 is disposed in rotatable manner downstream of the sheet feed roller 3 and the sheet feed driven roller 4 in terms of the sheet conveyance direction X (rightward in FIGURE) indicated by an arrow in FIGURE. The conveyor belt 5 is wound between the belt drive roller 6 and the belt driven roller 7. The belt drive roller 6 is disposed downstream of the driven roller 7 in terms of the sheet conveyance direction X. The belt drive roller 6 drives the conveyor belt 5. The belt driven roller 7 is disposed upstream of the drive roller 6 in terms of the sheet conveyance direction X. The belt driven roller 7 rotates following the rotation of the belt drive roller 6 through circulation of the conveyor belt 5. As a result of the belt drive roller 6 being rotationally driven in the clockwise direction in FIGURE, the sheet M is conveyed in the sheet conveyance direction X.

Furthermore, the ejection roller 8 and the ejection driven roller 9 are disposed downstream of the conveyor belt 5 in terms of the conveyance direction X. The ejection roller 8 is driven clockwise in FIGURE to eject the sheet M with an image formed thereon out of the apparatus housing. The ejection driven roller 9 is pressed against the upper part of the ejection roller 8 to be rotationally driven. The exit tray 10 is disposed downstream of the ejection roller 8 and the ejection driven roller 9 in terms of the sheet conveyance direction X. The sheet M ejected out of the apparatus housing is placed on the exit tray 10.

The inkjet recording apparatus 1 includes an ink set including mutually different inks (the ink of the first color, the ink of the second color, the ink of the third color, and the ink of the fourth color). The inks are accommodated in non-illustrated tanks and each supplied to a corresponding one of the four line recording heads 11. The inks are not limited specifically and may include a cyan ink, a magenta ink, a yellow ink, and a black ink, for example.

The image forming section 11 includes a first line recording head 11a that ejects the ink of the first color, a second line recording head 11b that ejects the ink of the second color, a third line recording head 11c that ejects the ink of the third color, and a fourth line recording head 11d that ejects the ink of the fourth color, which are arranged in the stated order from upstream in terms of the conveyance direction X. The first line recording head 11a, the second line recording head 11b, the third line recording head 11c, and the fourth line recording head 11d are supported at a height corresponding to a specific length from the upper surface of the conveyor belt 5 and arranged at substantially regular intervals. A color image is formed on the sheet M in a manner that the image forming section 11 ejects the inks toward the sheet M when the sheet M being conveyed on the conveyor belt 5 passes directly under the image forming section 11.

The heating section 12 includes a first heater 12a disposed just below the first line recording head 11a, a second heater 12b disposed just below the second line recording head 11b, a third heater 12c disposed just below the third line recording head 11c, and a fourth heater 12d disposed just below the fourth line recording head 11d, which are arranged in the stated order from upstream in terms of the conveyance direction X. The heating temperature of the first heater is at least 60° C. and no greater than 65° C. The heating temperature of the second heater is at least 50° C. and no greater than 55° C. The heating temperature of the third heater is at least 40° C. and no greater than 45° C. The heating temperature of the fourth heater is at least 30° C. and no greater than 35° C. Note that the heating temperatures of the first heater 12a to the fourth heater 12d each indicate the surface temperature thereof (specifically, the temperature of the surface thereof on the side of the conveyor belt 5).

One example of the inkjet recording apparatus of the present disclosure has been described so far. However, the inkjet recording apparatus of the present disclosure is not limited to that illustrated in FIGURE. For example, the inkjet recording apparatus 1 in FIGURE is an inkjet recording apparatus employing the plane transport system including the conveyor belt 5 as a conveyance section. However, the inkjet recording apparatus of the present disclosure may employ any transport system other than the plane transport system. For example, the inkjet recording apparatus of the present disclosure may be an inkjet recording apparatus employing the drum transport system including a conveyance drum.

In the inkjet recording apparatus 1 in FIGURE, the image forming section 11 is disposed above the conveyor belt 5 and the heating section 12 is disposed below the conveyor belt 5. However, the positional relationship between the image forming section and the heating section is not limited to the above in the inkjet recording apparatus of the present disclosure. Furthermore, the inkjet recording apparatus of the present disclosure may be a multifunction peripheral having functions of any of a scanner, a copier, a printer, or facsimile machine.

[Ink Set]

The ink set used in the inkjet recording apparatus of the present disclosure is described below in detail. The ink set includes an ink of a first color, an ink of a second color, an ink of a third color, and an ink of a fourth color. The inks (specifically, the ink of the first color, the ink of the second color, the ink of the third color, and the ink of the fourth color) each contain a pigment, a polysaccharide, an aqueous medium, and binder resin particles. The aqueous medium includes a glycol ether. The glycol ether has a boiling point of no greater than 200° C. The percentage content of the polysaccharide in each of the inks (specifically, the ink of the first color, the ink of the second color, the ink of the third color, and the ink of the fourth color) is at least 0.01% by mass and no greater than 0.20% by mass.

(Pigment)

The pigment in each of the inks constitutes pigment particles together with a pigment coating resin, for example. The pigment particles each include a core containing the pigment and the pigment coating resin covering the core, for example. The pigment coating resin is present in a dispersed state in a solvent, for example. In terms of increasing color density, hue, or stability of the ink, the pigment particles have a $D_{50}$ of preferably at least 30 nm and no greater than 200 nm, and more preferably at least 70 nm and no greater than 130 nm.

Examples of the pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23 or 33). Examples of the black pigments include C.I. Pigment Black (7).

As described previously, the inkjet recording apparatus of the present disclosure uses four inks. Typically, the four inks contain pigments of mutually different colors. Thus, the inkjet recording apparatus of the present disclosure can form color images.

The percentage content of the pigment in each of the inks is preferably at least 0.50% by mass and no greater than 10.00% by mass, and more preferably at least 1.50% by mass and no greater than 5.00% by mass. As a result of the percentage content of the pigment being set to at least 0.50% by mass, the inkjet recording apparatus of the present disclosure can easily form images with desired image density. As a result of the percentage content of the pigment being set to no greater than 10.00% by mass, fluidity of the pigment in each of the inks increases. Thus, the inkjet recording apparatus of the present disclosure can easily form images with desired image density.

(Pigment Coating Resin)

The pigment coating resin is a resin soluble in an aqueous medium. A portion of the pigment coating resin is present on the surfaces of the pigment particles, for example, to increase dispersibility of the pigment particles. Another portion of the pigment coating resin is present in a dissolved state in the aqueous medium, for example. The pigment coating resin is preferably an acrylic resin. The acrylic resin is a polymer of at least one monomer of (meth)acrylic acid alkyl ester and (meth)acrylic acid.

The percentage content of the pigment coating resin in each of the inks is preferably at least 0.10% by mass and no greater than 5.00% by mass, and more preferably at least 0.50% by mass and no greater than 2.00% by mass.

(Aqueous Medium)

The aqueous medium contained in each of the inks is a medium including water and a water-soluble organic solvent. The aqueous medium may function as a solvent or function as a dispersion medium. The aqueous medium includes a glycol ether.

(Water)

Preferably, the percentage content of the water in each of the inks is at least 40.00% by mass and no greater than 80.00% by mass. As a result of the percentage content of the water being set to at least 40.0% by mass and no greater than 80.0% by mass, ejection stability of the inks can be further optimized.

Among the four inks used in the inkjet recording apparatus of the present disclosure, the percentage content of the water in the ink to be ejected later in the sequence is lower. Preferably, the percentage content of the water in the ink of the first color is at least 68.00% by mass and no greater than 72.00% by mass. Preferably, the percentage content of the water in the ink of the second color is at least 65.00% by mass and no greater than 69.00% by mass. Preferably, the percentage content of the water in the ink of the third color is at least 62.00% by mass and no greater than 66.00% by mass. Preferably, the percentage content of the water in the ink of the fourth color is at least 59.00% by mass and no greater than 63.00% by mass.

(Glycol Ether)

The glycol ether imparts quick drying properties to the inks. Among the four inks used in the inkjet recording apparatus of the present disclosure, the percentage content of the glycol ether in the ink to be ejected later in the sequence is higher.

The glycol ether has a boiling point of no greater than 200° C. The boiling point of the glycol ether is preferably at least 100° C. and no greater than 200° C., and more preferably at least 160° C. and no greater than 195° C. As a result of the glycol ether having a boiling point of no greater than 200° C., satisfactory quick drying properties can be imparted to the inks. As a result of the glycol ether having a boiling point of at least 100° C., quick drying properties of the inks can be inhibited from becoming extreme. Note that the boiling point in the present specification refers to a boiling point at 1 atmosphere.

The glycol ether is a compound with a hydroxyl group (—OH group) at either or each end of alkylene glycol substituted with a lower alkyl group (e.g., alkyl group having a carbon number of no greater than 4). Examples of the glycol ether include ethylene glycol monomethyl ether (boiling point 124° C.), ethylene glycol monoethyl ether (boiling point 135° C.), ethylene glycol monobutyl ether (boiling point 171° C.), propylene glycol monomethyl ether (boiling point 120° C.), propylene glycol monoethyl ether (boiling point 132.8° C.), diethylene glycol monomethyl ether (boiling point 193° C.), diethylene glycol monoethyl ether (boiling point 196° C.), and dipropylene glycol monomethyl ether (boiling point 188° C.).

The glycol ether is preferably dipropylene glycol monomethyl ether or propylene glycol monomethyl ether. Note that the ink of the first color, the ink of the second color, the ink of the third color, and the ink of the fourth color may contain mutually different glycol ethers but preferably contain the same glycol ether.

The percentage content of the glycol ether in the ink of the first color is at least 11.50% by mass and no greater than 15.50% by mass, and preferably at least 12.50% by mass and no greater than 14.00% by mass. The percentage content of the glycol ether in the ink of the second color is at least 14.50% by mass and no greater than 18.50% by mass, and preferably at least 15.50% by mass and no greater than 17.00% by mass. The percentage content of the glycol ether in the ink of the third color is at least 17.50% by mass and no greater than 21.50% by mass, and preferably at least 17.50% by mass and no greater than 20.00% by mass. The percentage content of the glycol ether in the ink of the fourth color is at least 20.50% by mass and no greater than 24.50% by mass, and preferably at least 21.50% by mass and no greater than 23.00% by mass.

(Optional Water-Soluble Organic Solvent)

Preferably, the aqueous medium further contains an optional water-soluble organic solvent other than the glycol ether. Examples of the optional water-soluble organic solvent include glycol compounds, lactam compounds, nitrogen-containing compounds, acetate compounds, thiodiglycol, glycerin, and dimethyl sulfoxide. Preferably, the aqueous medium further contains a glycol compound.

Examples of the glycol compound include ethylene glycol, 1,2-propanediol, 1,3-propanediol, propylene glycol, 1,2-pentanediol, 1,5-pentanediol, 1,2-octanediol, 1,8-octanediol, 3-methyl-1,3-butanediol, 3-methyl-1,5-pentanediol, diethylene glycol, triethylene glycol, and tetraethylene glycol. Preferably, the glycol compound is 1,2-propanediol.

The percentage content of the glycol compound in each of the inks is preferably at least 3.00% by mass and no greater than 20.00% by mass, and more preferably at least 7.00% by mass and no greater than 12.00% by mass.

(Polysaccharide)

The polysaccharide imparts appropriate viscosity to the inks. The polysaccharide is a compound with monosaccharide molecules polymerized through glycosidic bonds. The polysaccharide may be a natural polysaccharide or may be a derivative of a natural polysaccharide.

Examples of the natural polysaccharide include amylose, amylopectin, starch, dextran, agarose, pectin, xanthan gum, tamarind gum, guar gum, alginic acid, locust bean gum, carrageenan, hyaluronic acid, chitin, heparin, and chondroitin.

Examples of the derivative of a natural polysaccharide include hydroxypropyl guar gum, cationized guar gum, carboxymethylcellulose, carboxymethylcellulose salts (e.g., sodium carboxymethylcellulose), hydroxyethylcellulose, hydroxypropylcellulose, and cationized cellulose.

The polysaccharide is preferably a carboxymethylcellulose salt, and more preferably sodium carboxymethylcellulose. Note that the ink of the first color, the ink of the second color, the ink of the third color, and the ink of the fourth color may contain mutually different polysaccharides but preferably contain the same glycol ether.

The percentage content of the polysaccharide in each of the inks (specifically, the ink of the first color, the ink of the second color, the ink of the third color, and the ink of the fourth color) is preferably at least 0.01% by mass and no greater than 0.20% by mass, and more preferably at least 0.05% by mass and no greater than 0.10% by mass. As a result of the percentage content of the polysaccharide being set to at least 0.01% by mass, the inkjet recording apparatus of the present disclosure can inhibit occurrence of blurring. As a result of the percentage content of the polysaccharide being set to no greater than 0.20% by mass, the inkjet recording apparatus of the present disclosure can inhibit production of white lines.

(Binder Resin Particles)

The binder resin particles are present in a dispersed state in the aqueous medium. The binder resin particles function as a binder for protecting the pigment on a recording medium. As a result of the ink containing the binder resin particles, it can be ensured that the pigment is fixed to recording mediums. Preferably, the binder resin particles have a number average primary particle diameter of at least 20 nm and no greater than 100 nm.

Examples of the resin contained in the binder resin particles include urethane resins, (meth)acrylic resins, styrene-(meth)acrylic resins, styrene-maleic acid copolymers, vinylnaphthalene-(meth)acrylic acid copolymers, and vinylnaphthalene-maleic acid copolymers. Preferably, the resin contained in the binder resin particles is a urethane resin.

The percentage content of the binder resin particles in each of the inks is preferably at least 0.10% by mass and no greater than 5.00% by mass, and more preferably at least 0.50% by mass and no greater than 1.50% by mass. As a result of the percentage content of the binder resin particles being set to at least 0.10% by mass, it can be further ensured that the pigment is fixed to recording mediums. As a result of the percentage content of the binder resin particles being set to no greater than 5.00% by mass, ejection stability of the inks can be optimized.

(Surfactant)

The ink may contain a surfactant. The surfactant increases wettability of the inks to recording mediums and compatibility of each component in the ink. The surfactant is preferably a nonionic surfactant.

Examples of the nonionic surfactant include silicone surfactants, acetylenediols, and ethylene oxide adducts of acetylenediols. Examples of the acetylenediols include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol.

The percentage content of the surfactant in each of the inks is preferably at least 0.10% by mass and no greater than 3.00% by mass, and more preferably at least 0.20% by mass and no greater than 1.00% by mass.

(Optional Component)

The ink may further contain a known additive (specific examples include an anti-drying agent, an antioxidant, a viscosity modifier, a pH adjuster, an antifungal agent, and a moisturizing agent) as necessary.

[Ink Production Method]

No particular limitations are placed on an ink production method so long as the pigment, the glycol ether, the polysaccharide, the binder resin particles, and the optional component optionally added as necessary can be mixed uniformly. An example of the ink production method is a method including stirring and uniformly mixing each component of an ink followed by removing foreign matter and coarse particles using a filter (e.g., a filter with a pore size of no greater than 5 μm).

Where water is added in the ink production method, ion exchange water is preferably added.

One example of the inkjet recording apparatus of the present disclosure and the inks used in the inkjet recording apparatus of the present disclosure have been described so far.

The present application further discloses the following inkjet recording method. The inkjet recording method of the present disclosure includes forming an image on a recording medium using an inkjet recording apparatus. The inkjet recording apparatus is the inkjet recording apparatus described in the present embodiment. Therefore, the inkjet recording method of the present disclosure can contribute to excellent ejection stability of the inks and inhibition of occurrence of blurring and production of white lines for the same reasons as those described for the inkjet recording apparatus according to the present embodiment.

EXAMPLES

The following describes examples of the present disclosure. However, the present disclosure is not limited to the following examples.

[Ink Preparation]

Components were added into a vessel so that the types and percentage contents thereof were those shown below in Tables 1 to 6. The vessel contents were uniformly mixed at a rotational speed of 400 rpm using a stirrer ("THREE-ONE MOTOR BL-600", product of Shinto Scientific Co., Ltd.). The resultant mixed liquid was filtered using a filter with a pore size of 5 µm in order to remove foreign matter and coarse particles from the mixed liquid. As a result, yellow inks (Y-1) to (Y-12), black inks (B-1) to (B-6), cyan inks (C-1) to (C-6), and magenta inks (M-1) to (M-6) were obtained. The yellow inks (Y-1) to (Y-11) and the magenta ink (M-6) were each used as the ink of the first color. The black inks (BK-1) to (BK-5) and the cyan ink (C-6) were each used as the ink of the second color. The cyan inks (C-1) to (C-5) and the black ink (B-6) were each used as the ink of the third color. The magenta inks (M-1) to (M-6) and the yellow ink (Y-12) were each used as the ink of the fourth color.

Details of each component indicated below in Tables 1 to 6 are as follows.

- Yellow pigment: "FAST YELLOW 7413" produced by (SANYO COLOR WORKS, Ltd.)
- Black pigment: "PRINTEX 85" produced by Orion Engineered Carbons KK
- Cyan pigment: "HELIOGEN (registered Japanese trademark) Blue D 7088" produced by BASF Japan Ltd.
- Magenta pigment: "RED No. 63" produced by Dainichiseika Color & Chemicals Mfg. Co., Ltd.
- DPM: dipropylene glycol monomethyl ether (boiling point 188° C.)
- PM: propylene glycol monomethyl ether (boiling point 120° C.)
- TGME: triethylene glycol monobutyl ether (boiling point 271° C.)
- CMC-Na: sodium carboxymethylcellulose ("CMC 1330", product of Daicel Miraizu Ltd., degree of esterification (degree of substitution): 1.0 to 1.5)
- Emulsion: urethane resin particle emulsion ("SUPERFLEX 870", product of DKS Co. Ltd., non-volatile content: 30% by mass, dispersion medium: water)
- Surfactant: acetylene surfactant ("SURFYNOL (registered Japanese trademark) 440", product of Nissin Chemical Industry Co., Ltd., ethylene oxide adduct of acetylene glycol, active component concentration: 100% by mass)

TABLE 1

| | First color | | Y-1 | Y-2 | Y-3 | Y-4 | Y-5 | Y-6 |
|---|---|---|---|---|---|---|---|---|
| [% by mass] | Yellow pigment | | 3.00 | 3.00 | 3.00 | 3.00 | 3.00 | 3.00 |
| | Glycol ether | DPM | 11.00 | 12.00 | 13.00 | 15.00 | 16.00 | 3.00 |
| | | PM | — | — | — | — | — | 13.00 |
| | | TGME | — | — | — | — | — | — |
| | Polysaccharide | CMC-Na | 0.08 | 0.08 | 0.08 | 0.08 | 0.08 | 0.08 |

TABLE 1-continued

| First color | Y-1 | Y-2 | Y-3 | Y-4 | Y-5 | Y-6 |
|---|---|---|---|---|---|---|
| 1,2-Propanediol | 10.00 | 10.00 | 10.00 | 10.00 | 10.00 | 10.00 |
| Emulsion | 3.00 | 3.00 | 3.00 | 3.00 | 3.00 | 3.00 |
| Surfactant | 0.50 | 0.50 | 0.50 | 0.50 | 0.50 | 0.50 |
| Ion exchange water | | | Rest | | | |
| Total | | | 100.00 | | | |

TABLE 2

| | First color | | Y-7 | Y-8 | Y-9 | Y-10 | Y-11 |
|---|---|---|---|---|---|---|---|
| [% by mass] | Yellow pigment | | 3.00 | 3.00 | 3.00 | 3.00 | 3.00 |
| | Glycol ether | DPM | — | 13.00 | 13.00 | 13.00 | 13.00 |
| | | PM | — | — | — | — | — |
| | | TGME | 13.00 | — | — | — | — |
| | Polysaccharide | CMC-Na | 0.08 | — | 0.01 | 0.20 | 0.21 |
| | 1,2-Propanediol | | 10.00 | 10.00 | 10.00 | 10.00 | 10.00 |
| | Emulsion | | 3.00 | 3.00 | 3.00 | 3.00 | 3.00 |
| | Surfactant | | 0.50 | 0.50 | 0.50 | 0.50 | 0.50 |
| | Ion exchange water | | | | Rest | | |
| | Total | | | | 100.00 | | |

TABLE 3

| | Second color | | B-1 | B-2 | B-3 | B-4 | B-5 |
|---|---|---|---|---|---|---|---|
| [% by mass] | Black pigment | | 3.00 | 3.00 | 3.00 | 3.00 | 3.00 |
| | Glycol ether | DPM | 14.00 | 15.00 | 16.00 | 18.00 | 19.00 |
| | | PM | — | — | — | — | — |
| | | TGME | — | — | — | — | — |
| | Polysaccharide | CMC-Na | 0.08 | 0.08 | 0.08 | 0.08 | 0.08 |
| | 1,2-Propanediol | | 10.00 | 10.00 | 10.00 | 10.00 | 10.00 |
| | Emulsion | | 3.00 | 3.00 | 3.00 | 3.00 | 3.00 |
| | Surfactant | | 0.50 | 0.50 | 0.50 | 0.50 | 0.50 |
| | Ion exchange water | | | | Rest | | |
| | Total | | | | 100.00 | | |

TABLE 4

| | Third color | | C-1 | C-2 | C-3 | C-4 | C-5 |
|---|---|---|---|---|---|---|---|
| [% by mass] | Cyan pigment | | 3.00 | 3.00 | 3.00 | 3.00 | 3.00 |
| | Glycol ether | DPM | 17.00 | 18.00 | 19.00 | 21.00 | 22.00 |
| | | PM | — | — | — | — | — |
| | | TGME | — | — | — | — | — |
| | Polysaccharide | CMC-Na | 0.08 | 0.08 | 0.08 | 0.08 | 0.08 |
| | 1,2-Propanediol | | 10.00 | 10.00 | 10.00 | 10.00 | 10.00 |
| | Emulsion | | 3.00 | 3.00 | 3.00 | 3.00 | 3.00 |
| | Surfactant | | 0.50 | 0.50 | 0.50 | 0.50 | 0.50 |
| | Ion exchange water | | | | Rest | | |
| | Total | | | | 100.00 | | |

TABLE 5

| | Fourth color | | M-1 | M-2 | M-3 | M-4 | M-5 |
|---|---|---|---|---|---|---|---|
| [% by mass] | Magenta pigment | | 3.00 | 3.00 | 3.00 | 3.00 | 3.00 |
| | Glycol ether | DPM | 20.00 | 21.00 | 22.00 | 24.00 | 25.00 |
| | | PM | — | — | — | — | — |
| | | TGME | — | — | — | — | — |
| | Polysaccharide | CMC-Na | 0.08 | 0.08 | 0.08 | 0.08 | 0.08 |
| | 1,2-Propanediol | | 10.00 | 10.00 | 10.00 | 10.00 | 10.00 |

TABLE 5-continued

| Fourth color | M-1 | M-2 | M-3 | M-4 | M-5 |
|---|---|---|---|---|---|
| Emulsion | 3.00 | 3.00 | 3.00 | 3.00 | 3.00 |
| Surfactant | 0.50 | 0.50 | 0.50 | 0.50 | 0.50 |
| Ion exchange water | | | Rest | | |
| Total | | | 100.00 | | |

TABLE 6

| | | | M-6 (First color) | C-6 (Second color) | B-6 (Third color) | Y-12 (Fourth color) |
|---|---|---|---|---|---|---|
| [% by mass] | Pigment | Yellow | — | — | — | 3.00 |
| | | Black | — | — | 3.00 | — |
| | | Cyan | — | 3.00 | — | — |
| | | Magenta | 3.00 | — | — | — |
| | Glycol ether | DPM | 13.00 | 16.00 | 19.00 | 22.00 |
| | | PM | — | — | — | — |
| | | TGME | — | — | — | — |
| | Polysaccharide | CMC-Na | 0.08 | 0.08 | 0.08 | 0.08 |
| | 1,2-Propanediol | | 10.00 | 10.00 | 10.00 | 10.00 |
| | Emulsion | | 3.00 | 3.00 | 3.00 | 3.00 |
| | Surfactant | | 0.50 | 0.50 | 0.50 | 0.50 |
| | Ion exchange water | | | | Rest | |
| | Total | | | | 100.00 | |

<Evaluation (First Color))>

Linewidth (blurring and white lines) and ejection stability were evaluated for inkjet recording apparatuses of test examples (I-1) to (I-9) and (i-1) to (i-7) by the following methods. Evaluation results are shown below in Tables 7 and 8. With the evaluation results, various conditions for ejection of the ink of the first color were examined. Note that the following evaluations were carried out at a temperature of 30° C. and a relative humidity of 20%.

[Inkjet Recording Apparatuses]

As evaluation apparatuses, inkjet recording apparatuses (prototype evaluation apparatuses produced by KYOCERA Document Solutions Japan Inc.) were prepared that included line recording heads, a conveyor belt, a heating section (under heaters), and cleaning blades that wipe the nozzle surfaces of the line recording heads. Each of the inkjet recording apparatuses was capable of changing the heating temperature of the heating section. The amount of ink to be ejected from each line recording head was set to 6 pL per one drop (1 pixel was to be formed with 6 pL of ink). A recording medium used was a PET film ("#50-S10", product of Toray Industries, Inc.).

An evaluation target (any of the magenta ink (M-6) and the yellow inks (Y-1) to (Y-11)) was loaded in one of the line recording heads as shown below in Tables 7 and 8. The temperature of the under heaters was set as shown below in Tables 7 and 8. In the manner described above, the inkjet recording apparatuses of the test examples (I-1) to (I-9) and (i-1) to (i-7) were prepared.

[Linewidth]

Using any of the inkjet recording apparatuses, a stripe image of parallel vertical lines (dot lines with 1-dot linewidth) was formed on a sheet of the recording medium. The linewidths of the vertical lines of the formed stripe image was measured at 10 locations, and the average (average linewidth) was calculated. The average linewidth measurement as above was carried out three times (in the following, first measurement, second measurement, and third measurement are also referred to below as N1, N2, and N3, respectively). Linewidth was evaluated according to the following criteria. As for linewidth, an excessively large evaluation value indicates a tendency to readily cause blurring, and is therefore unfavorable. By contrast, an excessively small evaluation value indicates a tendency to readily produce white lines in formation of solid images, and is therefore unfavorable.

(Criteria of Linewidth)

A (good): Linewidth in each of N1, N2, and N3 was at least 40.0 μm and less than 45.0 μm.

B (poor): Linewidth in at least one of N1, N2, and N3 was less than 40.0 μm or at least 45.0 μm.

[Ejection Stability]

Using any of the inkjet recording apparatuses, a pattern image (printing rate 3%) was formed consecutively on 5000 sheets of the recording medium using the inkjet recording apparatus. Subsequently, ink was purged from the recording heads of the inkjet recording apparatus and the nozzle surfaces of the recording heads was then wiped using the cleaning blades.

Next, an evaluation image was formed on one sheet of printing paper ("SUPER FINE PAPER", product of Seiko Epson Corporation, A4-size plain paper) using any of the evaluation apparatuses. The evaluation image was an image of striped patterns each including 55 vertical lines arranged in 6 rows (330 vertical lines in total) in terms of a printing direction. In each striped pattern, the linewidth was set to 1 dot and the distance between the lines was set to 3 dots (1-dot and 3-off pattern). With respect to each vertical line on the evaluation image, a distance (inter-line pitch) was measured between a target vertical line and another vertical line 16 pixels apart from the target vertical line. Thereafter, a dispersion (3σ [μm]) in inter-line pitch was calculated based on the inter-line pitch measured for each vertical line on the evaluation image. Ejection stability was evaluated according to the following criteria.

(Criteria of Ejection Stability)

A (good): evaluation value (3σ) of less than 20.0

A (poor): evaluation value (3σ) of at least 20.0

TABLE 7

| | | Test example (First color) | | | | | | | | |
|---|---|---|---|---|---|---|---|---|---|---|
| | | i-1 | I-1 | I-2 | I-3 | i-2 | i-3 | I-4 | I-5 | i-4 |
| Ink | | Y-3 | Y-3 | Y-3 | Y-3 | Y-3 | Y-1 | Y-2 | Y-4 | Y-5 |
| Temperature [° C.] | | 59 | 60 | 62 | 65 | 66 | 62 | 62 | 62 | 62 |
| Average linewidth [μm] | N1 | 45.6 | 44.4 | 43.2 | 41.5 | 41.1 | 46.0 | 44.8 | 42.6 | 40.8 |
| | N2 | 45.1 | 43.9 | 43.1 | 42.0 | 40.8 | 45.7 | 44.2 | 42.6 | 40.8 |
| | N3 | 45.3 | 44.8 | 42.7 | 42.6 | 42.5 | 45.5 | 44.2 | 42.4 | 40.4 |
| | Rating | B | A | A | A | A | B | A | A | A |
| Ejection stability [μm] | 3σ | 17.7 | 17.9 | 18.4 | 19.7 | 20.1 | 17.3 | 18.0 | 19.5 | 21.4 |
| | Rating | A | A | A | A | B | A | A | A | B |

TABLE 8

| | | Test example (First color) | | | | | | |
|---|---|---|---|---|---|---|---|---|
| | | I-6 | i-5 | i-6 | I-7 | I-8 | i-7 | I-9 |
| Ink | | Y-6 | Y-7 | Y-8 | Y-9 | Y-10 | Y-11 | M-6 |
| Temperature [° C.] | | 62 | 62 | 62 | 62 | 62 | 62 | 62 |
| Average linewidth [μm] | N1 | 43.6 | 39.5 | 50.5 | 44.1 | 40.5 | 38.9 | 42.5 |
| | N2 | 43.2 | 39.7 | 52.4 | 44.3 | 41.7 | 38.8 | 43.0 |
| | N3 | 44.0 | 38.4 | 53.8 | 44.7 | 40.7 | 39.7 | 43.1 |
| | Rating | A | B | B | A | A | B | A |
| Ejection stability [μm] | 3σ | 18.5 | 24.3 | 14.8 | 17.9 | 19.9 | 27.7 | 18.9 |
| | Rating | A | B | A | A | A | B | A |

Each of the inkjet recording apparatuses of the test examples (I-1) to (I-9) included a line recording head (i.e., the first line recording head) that ejects the ink of the first color. The ink of the first color contained a pigment, a polysaccharide, an aqueous medium including a glycol ether, and binder resin particles. The percentage content of the glycol ether in the ink of the first color was at least 11.50% by mass and no greater than 15.50% by mass. The glycol ether had a boiling point of no greater than 200° C. The percentage content of the polysaccharide in the ink of the first color was at least 0.01% by mass and no greater than 0.20% by mass. In each of the inkjet recording apparatuses of the test examples (I-1) to (I-9), the heating temperature of a under heater (corresponding to the first heater) was at least 60° C. and no greater than 65° C. It can be determined that the inkjet recording apparatuses of the test examples (I-1) to (I-9) exhibited excellent ejection stability and inhibited occurrence of blurring and production of white lines because of being rated as good in linewidth.

By contrast, the heating temperature of the under heater in the inkjet recording apparatus of the test example (i-1) was insufficient, less than 60° C., and the ink of the first color therefore dried insufficiently. As a result, the evaluation values exceeded the reference for linewidth and the inkjet recording apparatus of the text example (i-1) was therefore determined to tend to cause blurring.

The heating temperature of the under heater in the inkjet recording apparatus of the test example (i-2) was excessively high, greater than 60° C., and the ink of the first color therefore dried on the nozzle surface of the recording head. As a result, the inkjet recording apparatus of the test example (i-2) was rated as poor in ejection stability.

In the inkjet recording apparatus of the test example (i-3), the percentage content of the glycol ether in the ink of the first color was less than 11.50% by mass and quick drying properties of the ink of the first color were therefore insufficient. As a result, the evaluation values exceeded the reference for linewidth and the inkjet recording apparatus of the text example (i-3) was therefore determined to tend to cause blurring.

In the inkjet recording apparatus of the test example (i-4), the percentage content of the glycol ether in the ink of the first color was greater than 15.50% by mass and quick drying properties of the ink of the first color were therefore extreme. As a result, the inkjet recording apparatus of the test example (i-4) was rated as poor in ejection stability.

In the inkjet recording apparatus of the test example (i-5), the glycol ether contained in the ink of the first color had a boiling point of greater than 200° C. and quick drying properties of the ink of the first color was therefore insufficient. As a result, the inkjet recording apparatus of the text example (i-5) was rated as poor in ejection stability and the evaluation values was below the reference for linewidth. Therefore, the inkjet recording apparatus of the text example (i-5) was determined to tend to produce white lines.

In the inkjet recording apparatus of the test example (i-6), the ink of the first color did not contain a polysaccharide and viscosity of the ink of the first color was therefore insufficient. As a result, the evaluation values exceeded the reference for linewidth and the inkjet recording apparatus of the text example (i-6) was therefore determined to tend to cause blurring.

In the inkjet recording apparatus of the test example (i-7), the percentage content of the polysaccharide in the ink of the first color was greater than 0.20% by mass and viscosity of the ink of the first color was therefore extreme. As a result, the inkjet recording apparatus of the text example (i-7) was rated as poor in ejection stability, and the evaluation values were below the reference for linewidth. Therefore, the inkjet recording apparatus of the text example (i-7) was determined to tend to produce white lines.

Note that it is thought that for not only the ink of the first color but also the inks of the second to fourth colors, the boiling point of the glycol ether needs to be no greater than 200° C. and the percentage content of the polysaccharide needs to be at least 0.01% by mass and no greater than 0.20% by mass.

<Evaluation (Second Color)>

With respect to inkjet recording apparatuses of test examples (II-1) to (II-6) and (ii-1) to (ii-4), linewidth (blurring and white lines) and ejection stability were evaluated according to the same method as that for evaluating the inkjet recording apparatuses of the test examples (I-1) to (I-9) and (i-1) to (i-7) in all aspects other than the following changes. Evaluation results are shown below in Table 9. With the evaluation results, various conditions for ejection of the ink of the second color were examined.

In each of the inkjet recording apparatuses of the test examples (II-1) to (II-6) and (ii-1) to (ii-4), the type of the ink used and the heating temperature of a corresponding under heater (corresponding to the second heater in the present evaluation) were set as shown below in Table 9.

TABLE 9

| | | Test example (Second color) | | | | | | | | | |
|---|---|---|---|---|---|---|---|---|---|---|---|
| | | ii-1 | II-1 | II-2 | II-3 | ii-2 | ii-3 | II-4 | II-5 | ii-4 | II-6 |
| Ink | | B-3 | B-3 | B-3 | B-3 | B-3 | B-1 | B-2 | B-4 | B-5 | C-6 |
| Temperature [° C.] | | 49 | 50 | 52 | 55 | 56 | 52 | 52 | 52 | 52 | 52 |
| Average linewidth [μm] | N1 | 45.1 | 44.8 | 43.1 | 41.2 | 40.5 | 46.2 | 44.5 | 42.4 | 41.3 | 42.8 |
| | N2 | 45.3 | 44.7 | 43.3 | 42.1 | 40.2 | 45.5 | 44.9 | 41.9 | 40.5 | 44.0 |
| | N3 | 45.8 | 44.9 | 43.1 | 41.4 | 41.1 | 46.1 | 43.9 | 42.4 | 40.6 | 43.5 |
| | Rating | B | A | A | A | A | B | A | A | A | A |
| Ejection stability [μm] | 3σ | 17.9 | 18.2 | 18.6 | 19.8 | 20.3 | 18.4 | 19.1 | 19.7 | 20.1 | 18.1 |
| | Rating | A | A | A | B | A | A | A | B | A | A |

The inkjet recording apparatuses of the test examples (II-1) to (II-6) each included a line recording head (i.e., the second line recording head) that ejects the ink of the second color. The ink of the second color contained a pigment, a polysaccharide including a glycol ether, an aqueous medium, and binder resin particles. The percentage content of the glycol ether in the ink of the second color was at least 14.50% by mass and no greater than 18.50% by mass. The glycol ether had a boiling point of no greater than 200° C. The percentage content of the polysaccharide in the ink of the second color was at least 0.01% by mass and no greater than 0.20% by mass. In each of the inkjet recording apparatuses of the test examples (II-1) to (II-6), the heating temperature of the under heater (corresponding to the second heater) was at least 50° C. and no greater than 55° C. It can be determined that each of the inkjet recording apparatuses of the test examples (II-1) to (II-6) exhibited excellent ejection stability and inhibited occurrence of blurring and production of white lines because of being rated as good in linewidth.

By contrast, the heating temperature of the under heater in the inkjet recording apparatus of the test example (ii-1) was insufficient, less than 50° C., and the ink of the second color therefore dried insufficiently. As a result, the evaluation values exceeded the reference for linewidth and the inkjet recording apparatus of the text example (ii-1) was therefore determined to tend to cause blurring.

The heating temperature of the under heater in the inkjet recording apparatus of the test example (ii-2) was excessively high, greater than 55° C., and the ink of the second color therefore dried on the nozzle surface of the recording head. As a result, the inkjet recording apparatus of the test example (ii-2) was rated as poor in ejection stability.

In the inkjet recording apparatus of the test example (ii-3), the percentage content of the glycol ether in the ink of the second color was less than 14.50% by mass and the ink of the second color had insufficient quick drying properties. As a result, the evaluation values exceeded the reference for linewidth and the inkjet recording apparatus of the text example (ii-3) was therefore determined to tend to cause blurring.

In the inkjet recording apparatus of the test example (ii-4), the percentage content of the glycol ether in the ink of the second color was greater than 18.50% by mass and quick drying properties of the ink of the second color was extreme. As a result, the inkjet recording apparatus of the test example (ii-4) was rated as poor in ejection stability.

<Evaluation (Third Color)>

With respect to inkjet recording apparatuses of test examples (III-1) to (III-6) and (iii-1) to (iii-4), linewidth (blurring and white lines) and ejection stability were evaluated according to the same method as that for evaluating the inkjet recording apparatuses of the test examples (I-1) to (I-9) and (i-1) to (i-7) in all aspects other than the following changes. Evaluation results are shown below in Table 10. With the evaluation results, various conditions for ejection of the ink of the third color were examined.

In each of the inkjet recording apparatuses of the test examples (III-1) to (III-6) and (iii-1) to (ii-4), the type of the ink used and the heating temperature of a corresponding under heater (corresponding to the third heater in the present evaluation) were changed as shown below in Table 10.

TABLE 10

|  |  | Test example (Third color) | | | | | | | | | |
|---|---|---|---|---|---|---|---|---|---|---|---|
|  |  | iii-1 | III-1 | III-2 | III-3 | iii-2 | iii-3 | III-4 | III-5 | iii-4 | III-6 |
| Ink |  | C-3 | C-3 | C-3 | C-3 | C-3 | C-1 | C-2 | C-4 | C-5 | B-6 |
| Temperature [° C.] |  | 39 | 40 | 42 | 45 | 46 | 42 | 42 | 42 | 42 | 42 |
| Average linewidth [μm] | N1 | 45.2 | 44.6 | 43.4 | 40.9 | 40.3 | 45.1 | 44.5 | 42.0 | 40.5 | 42.3 |
|  | N2 | 45.2 | 44.8 | 42.8 | 41.5 | 40.6 | 45.9 | 44.6 | 42.1 | 40.3 | 43.1 |
|  | N3 | 45.5 | 44.3 | 42.6 | 40.9 | 40.5 | 45.8 | 44.6 | 41.6 | 40.8 | 43.5 |
|  | Rating | B | A | A | A | A | B | A | A | A | A |
| Ejection stability [μm] | 3σ | 17.7 | 18.1 | 18.3 | 19.9 | 20.2 | 18.0 | 18.8 | 19.8 | 20.1 | 18.8 |
|  | Rating | A | A | A | A | B | A | A | A | B | A |

The inkjet recording apparatuses of the test examples (III-1) to (III-6) each included a line recording head (i.e., the third line recording head) that ejects the ink of the third color. The ink of the third color contained a pigment, a polysaccharide, an aqueous medium including a glycol ether, and binder resin particles. The percentage content of the glycol ether in the ink of the third color was at least 17.50% by mass and no greater than 21.50% by mass. The glycol ether had a boiling point of no greater than 200° C. The percentage content of the polysaccharide in the ink of the third color was at least 0.01% by mass and no greater than 0.20% by mass. In each of the inkjet recording apparatuses of the test examples (III-1) to (III-6), the heating temperature of the under heater (corresponding to the third heater) was at least 40° C. and no greater than 45° C. It can be determined that the inkjet recording apparatuses of the test examples (III-1) to (III-6) exhibited excellent ejection stability and inhibited occurrence of blurring and production of white lines because of being rated as good in linewidth.

By contrast, the heating temperature of the under heater in the inkjet recording apparatus of the test example (iii-1) was insufficient, less than 40° C., and the ink of the third color therefore dried insufficiently. As a result, the evaluation values exceeded the reference for linewidth and the inkjet recording apparatus of the text example (iii-1) was therefore determined to tend to cause blurring.

The heating temperature of the under heater in the inkjet recording apparatus of the test example (iii-2) was excessively high, greater than 45° C., and the ink of the third color therefore dried on the nozzle surface of the recording head. As a result, the inkjet recording apparatus of the test example (iii-2) was rated as poor in ejection stability.

In the inkjet recording apparatus of the test example (iii-3), the percentage content of the glycol ether in the ink of the third color was less than 17.50% by mass and the ink of the third color had insufficient quick drying properties. As a result, the evaluation values exceeded the reference for linewidth and the inkjet recording apparatus of the text example (iii-3) was therefore determined to tend to cause blurring.

In the inkjet recording apparatus of the test example (iii-4), the percentage content of the glycol ether in the ink of the third color was greater than 21.50% by mass and quick drying properties of the ink of the third color was extreme. As a result, the inkjet recording apparatus of the test example (iii-4) was rated as poor in ejection stability.

<Evaluation (Fourth Color)>

With respect to inkjet recording apparatuses of test examples (IV-1) to (IV-6) and (iv-1) to (iv-4), linewidth (blurring and white lines) and ejection stability were evaluated according to the same method as that for evaluating the inkjet recording apparatuses of the test examples (I-1) to (I-9) and (i-1) to (i-7) in all aspects other than the following changes. Evaluation results are shown below in Table 11. With the evaluation values, various conditions for ejection of the ink of the fourth color were examined.

In each of the inkjet recording apparatuses of the test examples (IV-1) to (IV-6) and (iv-1) to (iv-4), the type of the ink used and the heating temperature of a corresponding under heater (corresponding to the fourth heater in the present evaluation) were set as shown below in Table 11.

TABLE 11

|  |  | Test example (Fourth color) | | | | | | | | | |
|---|---|---|---|---|---|---|---|---|---|---|---|
|  |  | iv-1 | IV-1 | IV-2 | IV-3 | iv-2 | iv-3 | IV-4 | IV-5 | iv-4 | IV-6 |
| Ink |  | M-3 | M-3 | M-3 | M-3 | M-3 | M-1 | M-2 | M-4 | M-5 | Y-6 |
| Temperature [° C.] |  | 29 | 30 | 32 | 35 | 36 | 32 | 32 | 32 | 32 | 32 |
| Average | N1 | 45.4 | 44.7 | 43.0 | 41.1 | 40.6 | 45.3 | 44.5 | 41.9 | 41.0 | 43.4 |
| linewidth | N2 | 45.3 | 44.8 | 43.2 | 42.0 | 40.1 | 45.6 | 44.2 | 41.6 | 41.1 | 43.6 |
| [μm] | N3 | 45.7 | 44.3 | 42.7 | 41.3 | 40.5 | 45.2 | 43.9 | 42.3 | 40.4 | 43.5 |
|  | Rating | B | A | A | A | A | B | A | A | A | A |
| Ejection | 3σ | 17.8 | 18.5 | 19.1 | 19.7 | 20.1 | 18.1 | 19.0 | 19.7 | 20.3 | 18.4 |
| stability [μm] | Rating | A | A | A | A | B | A | A | A | B | A |

The inkjet recording apparatuses of the test examples (IV-1) to (IV-6) each included a line recording head (i.e., the fourth line recording head) that ejects the ink of the fourth color. The ink of the fourth color contained a pigment, a polysaccharide including a glycol ether, an aqueous medium, and binder resin particles. The percentage content of the glycol ether in the ink of the fourth color was at least 20.50% by mass and no greater than 24.50% by mass. The glycol ether had a boiling point of no greater than 200° C. The percentage content of the polysaccharide in the ink of the fourth color was at least 0.01% by mass and no greater than 0.20% by mass. In each of the inkjet recording apparatuses of the test examples (IV-1) to (IV-6), the heating temperature of the under heater (corresponding to the fourth heater) was at least 30° C. and no greater than 35° C. It can be determined that the inkjet recording apparatuses of the test examples (IV-1) to (IV-6) exhibited excellent ejection stability and inhibited occurrence of blurring and production of white lines because of being rated as good in linewidth.

By contrast, the heating temperature of the under heater in the inkjet recording apparatus of the test example (iv-1) was insufficient, less than 30° C., and the ink of the fourth color therefore dried insufficiently. As a result, the evaluation values exceeded the reference for linewidth and the inkjet recording apparatus of the text example (iv-1) was therefore determined to tend to cause blurring.

The heating temperature of the under heater in the inkjet recording apparatus of the test example (iv-2) was excessively high, greater than 35° C., and the ink of the fourth color therefore dried on the nozzle surface of the recording head. As a result, the inkjet recording apparatus of the test example (iv-2) was rated as poor in ejection stability.

In the inkjet recording apparatus of the test example (iv-3), the percentage content of the glycol ether in the ink of the fourth color was less than 20.50% by mass and the ink of the fourth color had insufficient quick drying properties. As a result, the evaluation values exceeded the reference for linewidth and the inkjet recording apparatus of the text example (iv-3) was therefore determined to tend to cause blurring.

In the inkjet recording apparatus of the test example (iv-4), the percentage content of the glycol ether in the ink of the fourth color was greater than 24.50% by mass and quick drying properties of the ink of the fourth color was extreme. As a result, the inkjet recording apparatus of the test example (iv-4) was rated as poor in ejection stability.

What is claimed is:

1. An inkjet recording apparatus comprising:
   an ink set;
   a conveyance section that conveys a recording medium;
   an image forming section that is disposed at a location opposite to one side of the conveyance section and that performs inkjet recording on the recording medium with the ink set; and
   a heating section that is disposed at a location opposite to the image forming section with the conveyance section therebetween and that heats the recording medium, wherein
   the ink set includes an ink of a first color, an ink of a second color, an ink of a third color, and an ink of a fourth color,
   the image forming section includes:
      a first line recording head that ejects the ink of the first color;
      a second line recording head that ejects the ink of the second color;
      a third line recording head that ejects the ink of the third color; and
      a fourth line recording head that ejects the ink of the fourth color,
   the heating section includes:
      a first heater disposed at a location opposite to the first line recording head with the conveyance section therebetween;
      a second heater disposed at a location opposite to the second line recording head with the conveyance section therebetween;
      a third heater disposed at a location opposite to the third line recording head with the conveyance section therebetween; and
      a fourth heater disposed at a location opposite to the fourth line recording head with the conveyance section therebetween, the ink of the first color, the ink of the second color, the ink of the third color, and the ink of the fourth color each contain a pigment, a polysaccharide, an aqueous medium, and binder resin particles, the aqueous medium includes a glycol ether, the glycol ether has a boiling point of no greater than 200° C., a percentage content of the polysaccharide in each of the ink of the first color, the ink of the second color, the ink of the third color, and the ink of the fourth color is at least 0.01% by mass and no greater than 0.20% by mass, a percentage content of the glycol ether in the ink of the first color is at least 11.50% by mass and no greater than 15.50% by mass, a percentage content of the glycol ether in the ink of the second color is at least 14.50% by mass and no greater than 18.50% by mass, a percentage content of the glycol ether in the ink of the third color is at least 17.50% by mass and no greater than 21.50% by mass, a percentage content of the glycol ether in the ink of the fourth color is at least 20.50% by mass and no greater than 24.50% by mass, a heating temperature of the first heater is at least 60° C. and no greater than 65° C., a heating temperature of the second heater is at least 50° C. and no greater than 55° C., a heating temperature of the third heater is at least 40° C. and no greater than 45° C., and a heating temperature of the fourth heater is at least 30° C. and no greater than 35° C.

2. The inkjet recording apparatus according to claim 1, wherein the polysaccharide includes sodium carboxymethylcellulose.

3. The inkjet recording apparatus according to claim 1, wherein the glycol ether includes dipropylene glycol monomethyl ether or propylene glycol monomethyl ether.

4. The inkjet recording apparatus according to claim 1, wherein the aqueous medium further contains a glycol compound.

5. The inkjet recording apparatus according to claim 4, wherein a percentage content of the glycol compound in each of the ink of the first color, the ink of the second color, the ink of the third color, and the ink of the fourth color is at least 3.00% by mass and no greater than 20.00% by mass.

6. The inkjet recording apparatus according to claim 1, wherein the inkjet recording apparatus is used for image formation on a non-permeable recording medium.

7. The inkjet recording apparatus according to claim 1, wherein the first line recording head, the second line recording head, the third line recording head, and the fourth line recording head are arranged in stated order from upstream in terms of a conveyance direction of the recording medium conveyed by the conveyance section, the first heater, the second heater, the third heater, and the fourth heater are arranged in stated order from upstream in terms of the conveyance direction of the recording medium conveyed by the conveyance section, and a relationship is satisfied of the percentage content of the glycol ether in the ink of the first color<the percentage content of the glycol ether in the ink of the second color<the percentage content of the glycol ether in the ink of the third color<the percentage content of the glycol ether in the ink of the fourth color.

8. An inkjet recording method comprising forming, using the inkjet recording apparatus according to claim 1, an image on the recording medium.

* * * * *